United States Patent [19]

Maytham

[11] 4,179,804
[45] Dec. 25, 1979

[54] ADJUSTABLE ROLLER CABLE FEEDING AND STRIPPING TOOL

[75] Inventor: Walter J. Maytham, Los Altos, Calif.

[73] Assignee: Speed Systems, Inc., Los Altos, Calif.

[21] Appl. No.: 908,754

[22] Filed: May 23, 1978

[51] Int. Cl.² ............................................. B21F 13/00
[52] U.S. Cl. ..................................... 30/90.7; 30/90.1; 30/91.2; 81/9.5 R; 226/180; 414/432
[58] Field of Search ...................... 30/90.7, 90.1, 91.2, 30/90.2, 90.9; 81/9.5 R, 9.5 C; 214/338, 339; 226/179, 180, 176, 181, 178, 177

[56] References Cited

U.S. PATENT DOCUMENTS

| | | | |
|---|---|---|---|
| 2,505,168 | 4/1950 | Augustin | 214/339 |
| 3,040,946 | 6/1962 | Briggs | 226/180 |
| 3,260,390 | 7/1966 | Morain | 214/339 |
| 3,322,291 | 5/1967 | Smith | 226/180 |
| 3,664,531 | 5/1972 | Magnusson et al. | 214/339 |
| 3,713,555 | 1/1973 | Wloszek | 214/339 |
| 3,797,686 | 3/1974 | Jarvis | 214/338 |
| 3,854,614 | 12/1974 | Albrecht | 226/177 |
| 3,969,818 | 7/1976 | Maytham | 30/90.1 |
| 3,978,582 | 9/1976 | Maytham | 30/90.1 |

*Primary Examiner*—Robert L. Spruill
*Assistant Examiner*—J. T. Zatarga
*Attorney, Agent, or Firm*—Phillips, Moore, Weissenberger, Lempio & Majestic

[57] ABSTRACT

A tool for removing insulation from a cable includes a plurality of rollers, with the axis of rotation of each such roller being angled relative to the longitudinal axis of the cable at a certain angle, and a further plurality of rollers which are together adjustable so that the angle between the axis of rotation of each such roller is varied relative to the longitudinal axis of the cable.

7 Claims, 5 Drawing Figures

ADJUSTABLE ROLLER CABLE FEEDING AND STRIPPING TOOL

BACKGROUND OF THE INVENTION

This invention relates to cable stripping tools, and more particularly to tools for stripping insulation from electrical conductors.

U.S. Pat. No. 3,969,818 (assigned to the Assignee of this invention) discloses a tool for stripping insulation from electrical cable which has proved highly effective in operation. In such device, rollers in contact with the cable are each angled relative to the longitudinal axis of the cable so that the supported cable and tool move relatively along the longitudinal axis of the supported cable as the tool is turned about the cable. Thus, highly efficient feeding of the cable relative to the tool takes place.

While the utility of such an apparatus will be readily apparent, it will be understood that an increase in overall utility of a tool of this general type is to be desired. For example, with fixed rollers of the type in U.S. Pat. No. 3,969,818, a certain degree of feed per rotation is designed into the apparatus. It will be understood that it would be highly advantageous to provide a tool wherein the rate of feed may be varied as chosen, and in fact, wherein the rate of feed can be chosen to be zero to allow a flat face of insulation to be cut on an end thereof.

SUMMARY OF THE INVENTION

It is accordingly an object of this invention to provide a cable feeding and stripping tool which utilizes highly effective means for determining and varying the axial thickness of cable insulation to be cut for each turn of the tool and cable relatively.

It is a further object of this invention to provide a cable feeding and stripping tool which, while fulfilling the above object, provides for smooth and efficient rotation of the tool and cable relatively.

It is a still further object of this invention to provide a cable feeding and stripping tool which, while fulfilling the above objects, is capable of accommodating cables of a variety of diameters.

It is a still further object of this invention to provide a cable feeding and stripping tool which, while fulfilling the above objects, is extremely simple in design and effective in use.

Broadly stated, the invention comprises a tool for feeding a cable, comprising a body and support means mounted to the body to contact and support a cable seated thereon. The support means comprise roller means mounted to the body and positionable in a plurality of positions relative thereto to provide a plurality of positions of the angle of the rotational axis of the roller means relative to the longitudinal axis of a cable seated on the support means. This provides that, upon relative turning of the body and cable supported by the support means about the longitudinal axis of the supported cable, the supported cable and body relatively move generally along the longitudinal axis of the supported cable for each turn of the body and cable relatively, at a rate determined by the positioning of the roller means relative to the body.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
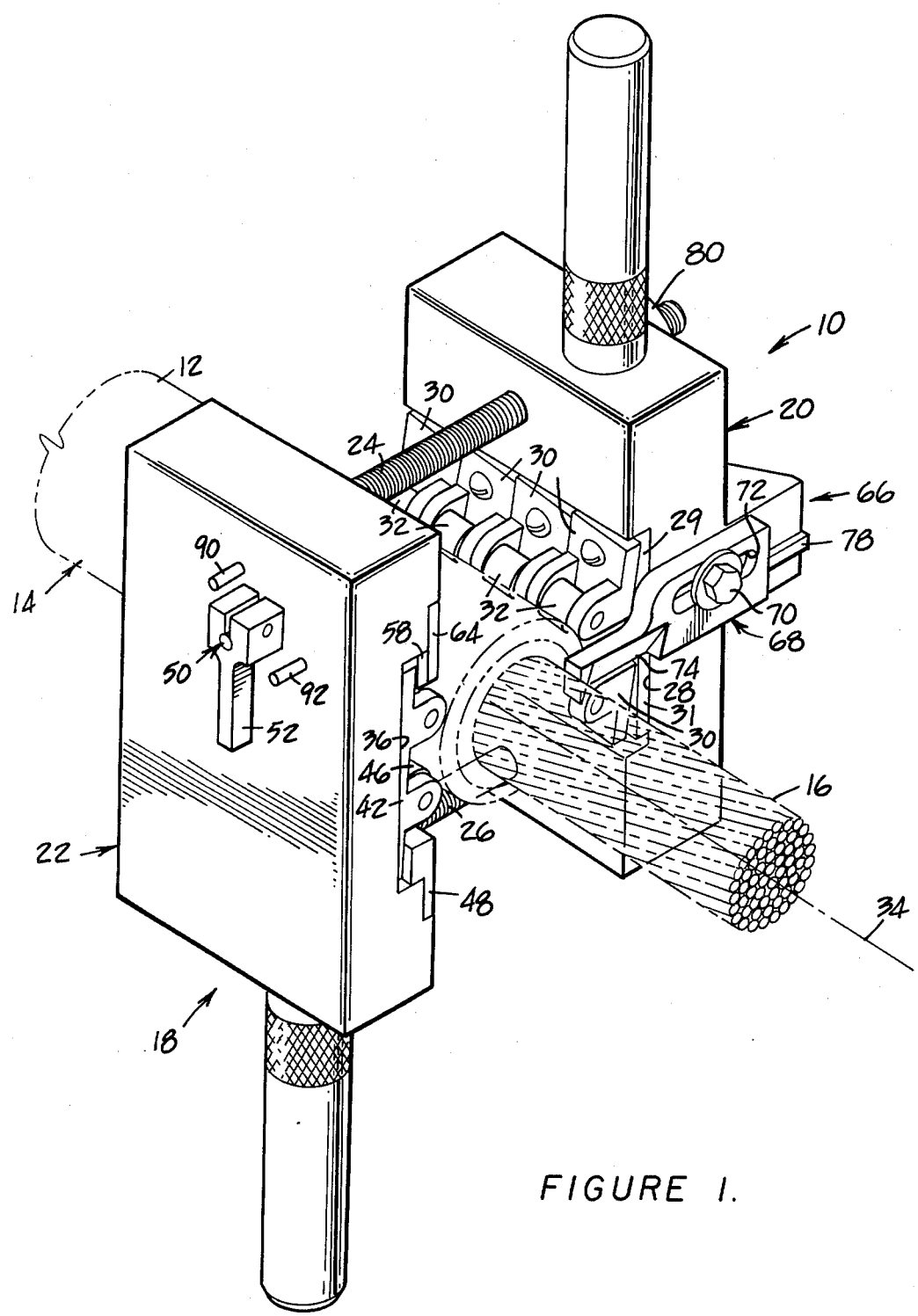
FIG. 1 is an overall perspective view of the apparatus.
Figure 2:
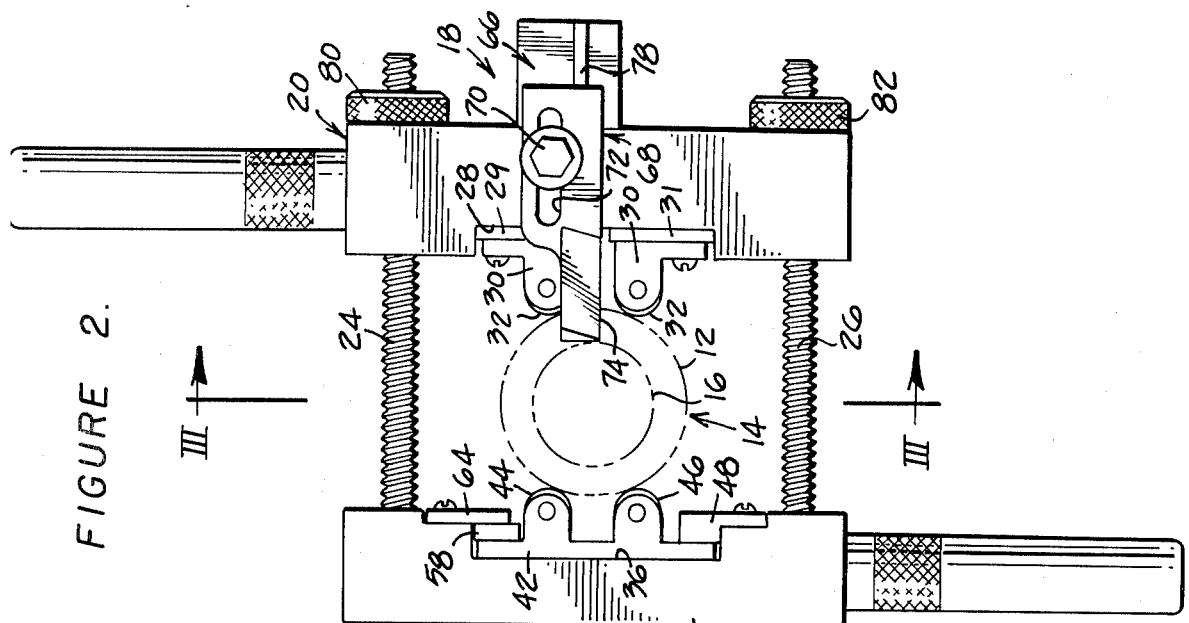
FIG. 2 is a side view of the apparatus of FIG. 1

Shown in FIGS. 1 and 2 is the overall tool 10 for use in removing or stripping insulation 12 from a cable 14, such insulation 12 covering the core or conductor 16 of the cable 14. The cable 14 in this case may have, for example, a diameter of from 1½ inches to 3¼ inches, and the insulation 12 provided on such cable may include a number of concentric layers of insulating and protective materials, frequently of substantially greater cross-sectional extent than that of the conductor itself. These materials may include, for example, rubber, light metal shielding, polyvinyl chloride, synthetic elastomers and semiconductors possessing different degrees of thickness and cutting resistance. Thus, the reference to insulation used herein is to be taken to mean any of these layers overlying the core or conductor.

Figure 4:
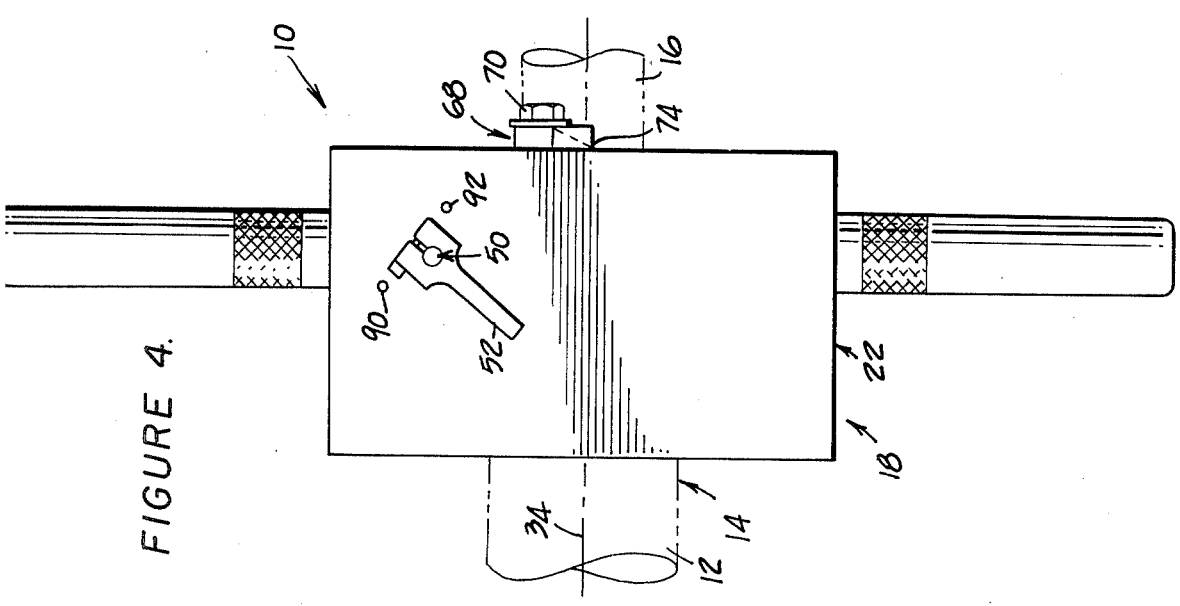
FIG. 4 is an end view of the apparatus.

The tool 10 includes a body 18 made up of a body portion 20 and a body portion 22. The body portion 22 has fixed thereto and extending generally perpendicularly therefrom threaded shafts 24, 26 which extend through apertures defined by the body portion 20. The shafts 24, 26 allow movement of the body portions 20, 22 relatively toward and away from each other, through sliding of the shafts 24, 26 in the respective apertures, and the cable 14 is positionable as shown in FIGS. 1, 2 and 4 between the body portions 20, 22 on rollers, as will be further described.

Figure 3:
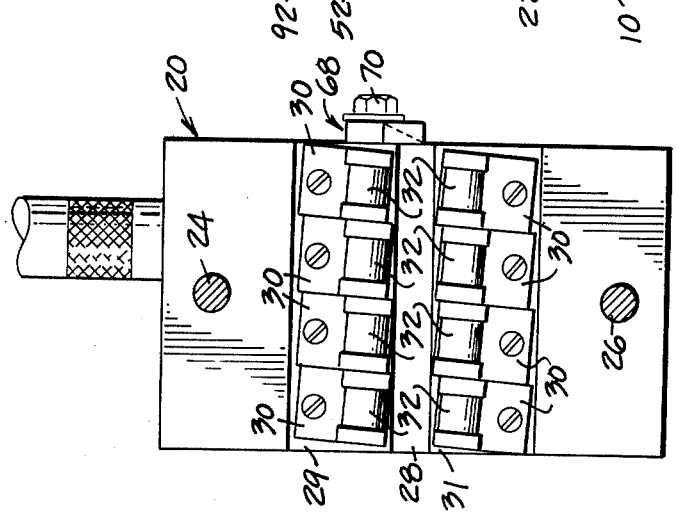
FIG. 3 is a view taken along the line III—III of FIG. 2.

As shown in FIGS. 1, 2 and 3, the body portion 20 defines an indented portion 28 in which are fixed plates 29, 31, to which in turn are fixed roller mounts 30. Each of the roller mounts 30 has rotatably mounted thereto a roller 32, and the roller mounts 30 are positioned relative to the body portion 20 such that the rotational axis of each roller 32 is positioned at the same certain angle relative to the longitudinal axis 34 of the cable 14, with each such axis being angled in the same direction relative to the longitudinal axis 34 of the cable 14.

Throughout this Specification, "angled in the same direction" is to mean that if the axis of rotation of one roller is angled in the same direction as the axis of rotation of another roller, both rollers urge feed of the cable in the same direction upon rotation of the tool and cable relatively; "angled in the opposite direction" is to mean that if the axis of rotation of one roller is angled in the opposite direction from the axis of rotation of another roller, the rollers urge feed of the cable in opposite directions upon rotation of the tool and cable relatively.

Figure 5:
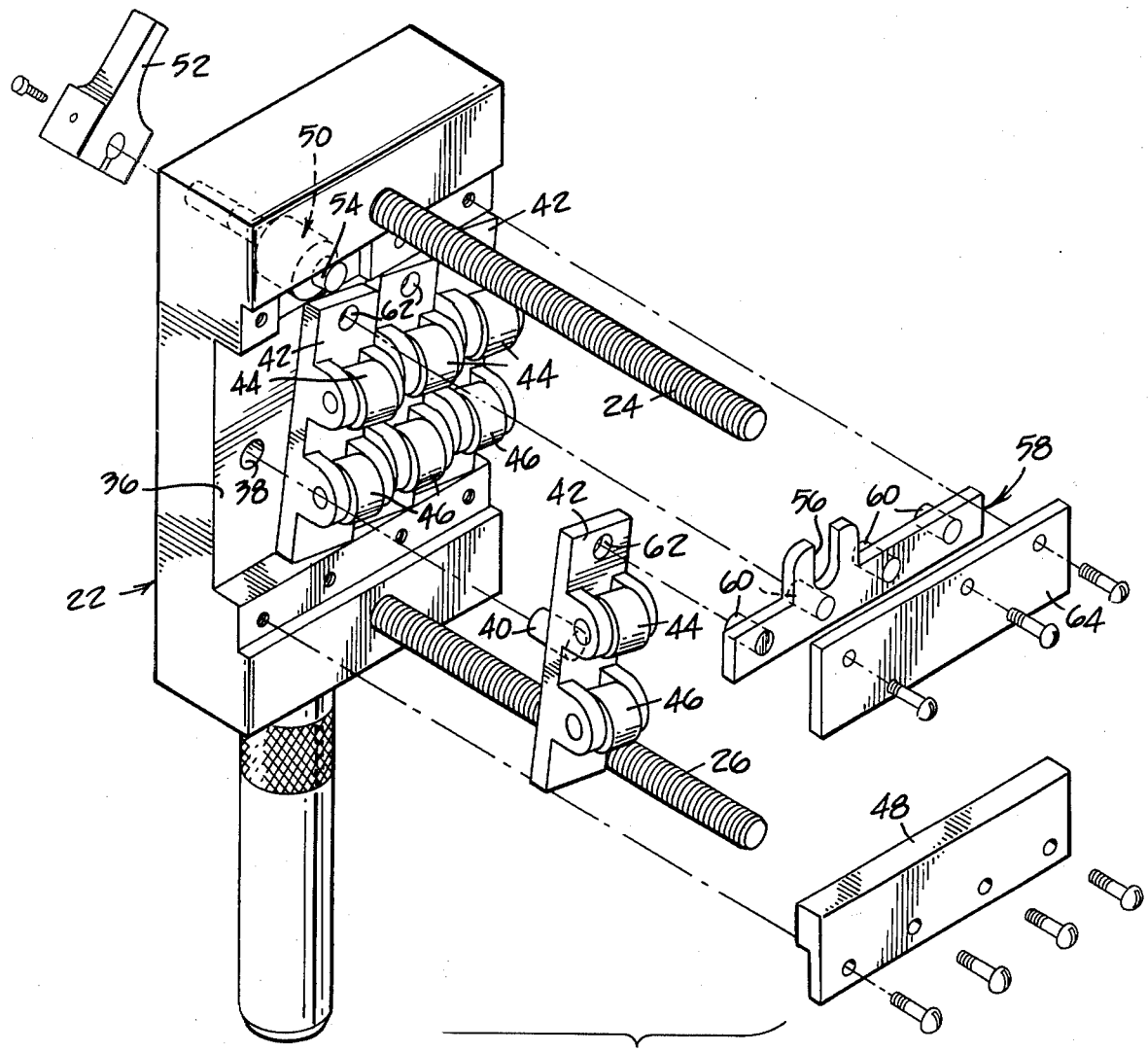
FIG. 5 is an exploded view of a portion of the apparatus.

Referring to FIGS. 1 and 2, and particularly to FIG. 5, the body portion 22 also has an indented portion 36 therein, and defines a plurality of bores 38 which receive pins 40 fixed to respective roller mounting structures 42. Each roller mounting structure 42 has a pair of rollers 44, 46 rotatably mounted thereto, with the respective rotational axes of this pair of rollers 44, 46 being parallel. The roller mounting structures 42 are in side-by-side relation positioned within the indented portion 36, but are appropriately positioned to allow the roller mounting structures 42 to be pivoted together to a variety of positions through the pin-and-bore mountings thereof.

A retaining plate 48 is secured to the body portion 22 to overlap adjacent ends of the mounting structures 42. An elongated rotatable member 50 is mounted in a bore of the body portion 22 as shown, and has an actuating arm 52 fixed to an extended end thereof. The opposite extended end of the member 50 terminates in an eccentric camming surface 54 which seats within a U-shaped portion 56 of a follower 58. The follower 58 has pins 60 secured to and extending therefrom which seat in respective bores 62 defined by the adjacent respective ends of the mounting structures 42. Another retainer 64 is secured to the body portion 22, overlapping the follower 58, which in turn overlaps the opposite adjacent ends of the mounting structures 42. The retainer 64 is appropriately positioned to allow sliding movement of the follower 58 therealong.

It will be seen that upon movement of the actuating arm 52 to rotate the member 50, the camming surface 54 moves the follower 58 in one or the other directions, depending on the positioning of the camming surface 54 and the direction of rotation of the member 50, which in turn pivots the mounting structures 42 relative to the body portion 22. The positioning of the pins 60 and bores 62 is chosen so that upon any given setting, all the rollers 44, 46 are at the same angle and angled in the same direction relative to the longitudinal axis 34 of a cable 14 supported thereon.

It will readily be seen that the rollers 44, 46 are positionable in a plurality of positions relative to the body portion 22, through movement of the actuating arm 52. This in turn provides a plurality of positions of the angles of the rotational axes of the rollers 44, 46 relative to the longitudinal axis 34 of a cable 14 seated thereon.

The body portion 20 has mounted thereto a block 66, and a blade 68 is mounted to the block 66 and body portion 20. A bolt 70 is disposed through a slotted hole 72 defined by the blade 68 and in threaded engagement with the body portion 20. The blade 68, through utilization of the slotted hole 72, may be adjusted positionwise relative to the body portion 20 to move the cutting edge 74 thereof toward and away from the longitudinal axis 34 of a cable 14 seated on the rollers 32, 44, 46. For providing the guiding of such adjustment motion, the blade 68 defines an elongated rib 78 positioned and seated in the recess, the elongated recess and rib 78 being substantially parallel to the cutting edge 74 of the blade 68.

Nuts 80, 82 are threadably engaged with the respective threaded shafts 24, 26 so that the body portions 20, 22 may be forced together with the cable 14 therebetween upon hand turning of the nuts 80, 82 to seat the cable 14 on the rollers 32, 44, 46.

In a particular embodiment of the apparatus, the rotational axis of each roller 32 is set at 5° in the same direction relative to the longitudinal axis 34 of a seated cable 14. Meanwhile, it will be seen that the rotational axes of the rollers 44, 46 are adjusted together relative to the longitudinal axis 34 of the cable 14, with, in this embodiment, the rotational axis of each roller 44, 46 being positionable between the extremes of 5° in one direction relative to the longitudinal axis 34 of the seated cable 14, to 5° in the opposite direction relative to the longitudinal axis 34 of the seated cable 14.

A pair of pins 90, 92 are secured to the body portion 22 to limit movement of the actuating arm 52 in one and the other directions, the limiting positions determining the 5° positions of the longitudinal axes of the rollers 44, 46 in one and the other directions respectively.

In the use of the tool 10, the nuts 80, 82 are backed off shafts 24, 26 to allow the placement of a cable 14 between the body portions 20, 22. Such body portions 20, 22 are then forced together by the turning of the nuts 80, 82 to seat the cable 14 on the rollers 32, 44, 46. The cable 14 is initially seated to bring the insulation 12 into contact with the cutting edge 74 of the blade 68. The tool 10 is rotated about the longitudinal axis 34 of the cable 14 by means of handles 84, 86 respectively fixed to and extending from the body portions 20, 22. Initially, for example, with the rollers 44, 46 angled in the same direction relative to the longitudinal axis 34 of the cable 14 as the rotational axes of the rollers 32, and also set at 5° relative to the longitudinal axis 34 of the cable 14, rotation of the tool 10 about the longitudinal axis 34 of the cable 14 provides for a certain degree of feed of the supported cable 14 for each turn of the tool 10 and cable 14 relatively. This results in the blade 68 cutting a certain axial thickness of insulation 12 for each relative turn of the tool 10 and cable 14. If the angle between the axis of rotation of the rollers 44, 46 and the longitudinal axis 34 of the cable 14 is lessened slightly by movement of the arm 52, it will be seen that the feed of the cable 14 and tool 10 for each turn of the tool 10 and cable 14 relatively is slightly less. This is so because a certain amount of slippage will occur along the rotational axis of each roller 32, 44, 46 between the roller surface and the surface of the cable 14, so that the feed is less than it would be if determined by the more greatly angled rollers 32, but greater than it would be if determined by the lesser angled rollers 44, 46.

It will therefore be seen that the positioning of the rollers 44, 46 may be varied to provide a wide variety of rates of feed of the cable 14 for each turn of the tool 10 and cable 14 relatively.

If the arm 52 is moved to provide that the longitudinal axis of each roller 44, 46 is at an angle of 5° in the opposite direction relative to the longitudinal axis 34 of the cable 14, it will be seen that no feeding of the cable 14 takes place relative to the tool 10 upon turning of the tool 10 and cable 14 relatively. This state is chosen when such non-feeding state is desired, so that when the stripping operation is to be ended, a flat end face of insulation 12 remains on the cable 14.

It will readily be seen that simple and effective means are provided for feeding a cable through a cutting tool upon rotation of the tool about the longitudinal axis of the cable. The rate of feed may be chosen in a simple and convenient manner, and it will be noted that means are provided for determining that no feed of the cable takes place as chosen, this being desirable to provide a square cut of the end of the insulation after the stripping operation has been completed.

What is claimed is:
1. A cable insulation stripping tool comprising:
a body; and
roller means mounted to the body and adapted for contacting and supporting a cable which can be seated thereon, and means for changing the position of said roller means relative to said body to provide a plurality of angles as defined by the rota- tional axis of the roller means relative to the longitudinal axis of the cable seated on the roller means; and blade means mounted to the body and having a cutting edge, the blade means positioned relative to the body so as to engage insulation of the cable.

2. The apparatus of claim 1 wherein the roller means is pivotally mounted to the body and further wherein said position changing means comprises an actuating member rotatably mounted to the body and having a camming surface in operative association with the roller means.

3. The apparatus of claim 2 wherein the roller means comprise a roller mounting structure pivotally connected to the body, and a roller rotatably mounted thereto.

4. The apparatus of claim 1 wherein said position changing means can position said roller means so as to prevent feeding of the cable.

5. The apparatus of claim 1 further comprising additional roller means fixed in position to the body.

6. The apparatus of claim 5 wherein the first-mentioned roller means are pivotally mounted to the body so as to be pivotable to said plurality of positions.

7. The apparatus of claim 6 wherein the additional roller means are positioned to determine a certain angle in one direction between the rotational axis thereof and the longitudinal axis of a supported cable, and wherein the first-mentioned roller means are pivotable to a first extreme position wherein the angle between the rotational axis thereof and the longitudinal axis of a supported cable is the same as and in the same direction as said certain angle, and wherein the first-mentioned means are pivotable to a second extreme position wherein the angle between the rotational axis thereof and the longitudinal axis of a supported cable is the same as but in a direction opposite to said certain angle.

* * * * *